(12) United States Patent  
Knittel

(10) Patent No.: US 6,903,737 B2  
(45) Date of Patent: Jun. 7, 2005

(54) METHOD AND APPARATUS FOR IMPLEMENTING SPREAD MEMORY LAYOUT

(75) Inventor: Guenter Knittel, Neustetten (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 280 days.

(21) Appl. No.: 10/056,317

(22) Filed: Jan. 23, 2002

(65) Prior Publication Data

US 2002/0118206 A1 Aug. 29, 2002

Related U.S. Application Data

(60) Provisional application No. 60/263,641, filed on Jan. 23, 2001.

(51) Int. Cl.[7] .............................................. G06T 17/00
(52) U.S. Cl. ...................................... 345/420; 345/544
(58) Field of Search ................................ 345/419, 420, 345/424, 426, 538, 544, 557; 711/127–129, 173, 202, 209, 153

(56) References Cited

U.S. PATENT DOCUMENTS 5,123,084 A * 6/1992 Prevost et al. ............... 345/420
5,163,095 A * 11/1992 Kosaka ........................ 382/133
5,860,149 A * 1/1999 Fiacco et al. ................ 711/209
6,243,098 B1 * 6/2001 Lauer et al. .................. 345/424
6,473,835 B2 * 10/2002 Luick .......................... 711/122
2003/0196041 A1 * 10/2003 Sturges et al. ............... 711/129

OTHER PUBLICATIONS

Guenter Knittel, "High–speed software raycasting on a dual–CPU PC using cache optimizations, MMX, streaming SIMD extensions, multi–threading, and DirectX" (Jan. 24–26, 2000), Proceedings of the SPIE—The International Society for Optical Engineering vol. 3960, pp. 164–174.
Guenter Knittel, "The UltraVis System", (Jul. 27, 2000), HP Lab Technical Report No. HPL–2000–100.

* cited by examiner

Primary Examiner—Almis R. Jankus
(74) Attorney, Agent, or Firm—Marc P. Schuyler

(57) ABSTRACT

This disclosure provides a system for efficiently processing a data set. More particularly, image data such as volumetric data are stored in a spread memory fashion, with image data subsets occupying only a fraction of each page. Each memory page is sized to roughly map to processor cache size (or a section thereof), such that image data is always mapped to one or more predetermined fractions of processor cache. By keeping processing parameters (e.g., look-up tables and buffers) in the remainder of cache, the system effectively locks those parameters against overwrite by the image data. This system facilitates the use of conventional workstations, laptops and other machines not enhanced for processing large or complicated data sets. It also extends capabilities of both un-enhanced and enhance machines, permitting them to process data more efficiently.

36 Claims, 3 Drawing Sheets

METHOD AND APPARATUS FOR IMPLEMENTING SPREAD MEMORY LAYOUT

The present invention relates to a method and apparatus for implementing a spread memory layout. More particularly, this disclosure provides a system suited for more efficiently processing image data and, in particular, volumetric data.

This application claims priority of U.S. Provisional Patent Application No. 60/263,641, for "Spread Memory Data Layout for Reducing Cache Misses," filed on Jan. 23, 2001 on behalf of inventor Guenter Knittel. That provisional application is hereby incorporated by reference as though identically set forth herein.

BACKGROUND

In the field of data processing, particularly the processing of three-dimensional images, digital processors are often called upon to process a large data set. Important applications of this type include medical imaging applications, such as certain ultrasound and magnetic resonance imaging (MRI) processes, certain imaging applications used in the oil and gas industry and non-destructive materials testing, and other applications as well. In these applications, it is often desirable to provide a quickly updated view (e.g., at least a few frames per second) that may be manipulated to provide any desired angle, both inside and outside a structure being viewed. For example, in the medical industry, it may be desired to first obtain volumetric data of an internal organ and then manipulate the view of that organ (both inside and outside the organ) to observe and diagnose its condition.

In many typical imaging applications, the digital processor is part of a high-end graphics computer or special purpose machine, and there may be one or more digital processors that cooperate to provide variable image outputs; in many applications, a frame-rate of at least ten frames per second is desired, and sometimes, a rate of thirty or more frames per second is desired. To create each frame, the one or more digital processors typically first accept a viewpoint (or perspective) desired by a user and then manipulate a three-dimensional data set to reflect the proper perspective and distance with respect to the viewpoint; the digital processor or processors then may process the data to derive a frame representing the proper two-dimensional view, e.g., accounting for the fact that given the perspective of the data, some relatively close opaque data may hide other data. While there are a variety of different processes that may be used to perform this "rendering," most of these processes call for "rays" to be taken through the three-dimensional data set from the user's viewpoint, each ray representing one pixel in an output image frame; during this process, data points in the three-dimensional space are taken along each particular ray and either processed to contribute to the color and intensity seen at that pixel by the user, or discarded as hidden. Special effects such as reflection from multiple light sources, texture, and other processes may also be performed in connection with raycasting.

Unfortunately, it is often difficult to perform processing of large or complicated data sets on a wide range of computer equipment, especially on conventional workstations and laptops. This difficulty may be tied to how processing is conventionally employed by many of these machines. Typically, a data set and parameters needed to process that data set might be stored in the main memory of the computer (such as in RAM, on hard disk or on CDROM) and extensive time is needed to continually fetch typically small portions of data and parameters, to process them and return them to memory once processed. Most digital processors will have an on chip "cache," that is, memory space that is in the processor and that is used when fast access to data is needed, but unfortunately, cache space is limited and is generally managed in a manner that results in frequent replacement of needed data. When a subsequent "cache miss" occurs as the processor again looks for the needed data or parameters, an undesired time delay may be consumed in attempting to again retrieve the these data and parameters from main memory.

Typical cache management protocols are therefore not well suited to processing of large or complicated data sets and fast processing of data from those sets by a processor. As a result, non-specialized machines (e.g., conventional workstations, laptops and other machines) typically cannot efficiently process large or complicated data, such as volumetric or other image data, and even enhanced machines may have their processing resources strained.

What is needed is a system that can process data to provide for more efficient processing of that data. Ideally, such a system would enable processing and output of data in real time. In the case of volumetric data or other three-dimensional image data, for example, such a system would ideally provide for real time output of at least ten frames per second. Further still, such a system ideally would enable common machines such as conventional laptops and workstations (e.g., those having conventional "Pentium" or other brands of microprocessors) to process volumetric data in real time. Finally, such a system would preferably have application to any form of data set, e.g., two-dimensional data, such that it could improve many forms of data processing such as used in games and other applications. The present invention satisfies these needs and provides further, related advantages.

SUMMARY

The present invention satisfies these needs by providing a method and apparatus for implementing a spread memory layout. Using this method and apparatus, one may implement relatively effective processing on a wide range of machines, e.g., conventional computer workstations, laptops, and similar devices, but also even upon high-end graphics processing machines. As should be apparent, the present invention therefore potentially extends capabilities of these machines and the types of applications that many of these machines can run.

One form of the present invention provides a data set stored on machine-readable media. This data set is divided into multiple subsets of image data and stored on the machine-readable media using a spread memory layout. The spread memory layout effectively causes the data subsets to each be associated with a page in memory and to be mapped to only specific portions of a page. Each page is sized to map to a quick access memory of a processor (or a section of that quick access memory), such that data when fetched from the machine-readable media is mapped only into predetermined parts of quick access memory.

Other forms of the present invention provide, respectively, a method and apparatus that roughly correspond to the principles described above.

In more particular features of each of these forms of the invention, the quick access memory can be a processor cache, and an addressing scheme implemented by the spread memory layout can cause image data to always be mapped into specific lines of cache such that, notwithstanding conventional cache management techniques, the image data never overwrites "processing parameters" such as a pixel buffer, rendering parameters, tables, and other "parameters" used to process image data.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

DETAILED DESCRIPTION

Figure 1:
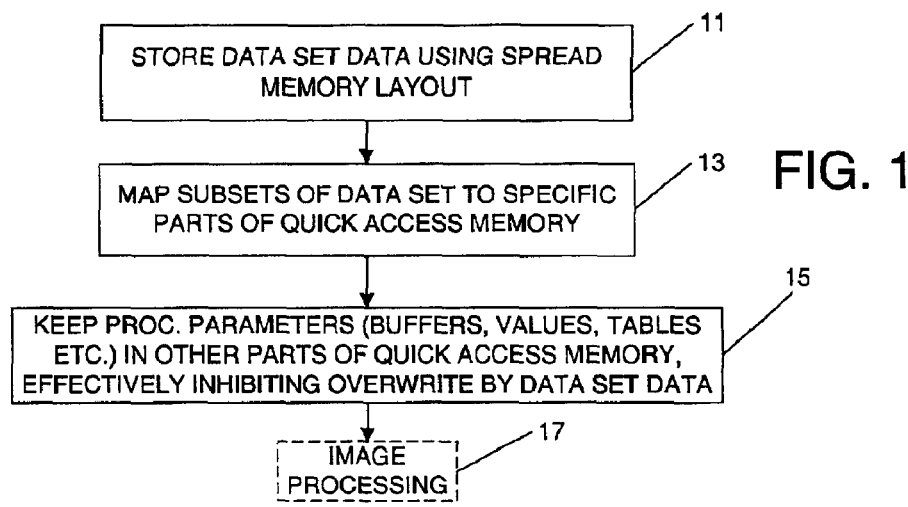
FIG. 1 is a functional diagram that illustrates processes performed in accordance with the present invention.

The invention summarized above and defined by the enumerated claims may be better understood by referring to the following detailed description, which should be read in conjunction with the accompanying drawings. This detailed description of one ore more particular embodiments, set out below to enable one to build and use various implementations of the invention, is not intended to limit the enumerated claims, but to exemplify their application to certain devices. The description set out below exemplifies application of the invention to the environment of a digital process that processes a data set stored in main memory; several examples of use of management of this memory and its data are given, with detailed implementation described for a particular digital processor (a "Pentium III" processor, made by Intel) as well as software to process volumetric data. The invention, however, may also be applied to other types of processors and, more generally, to other types of systems and applications as well.

I. Introduction

Volume rendering is a well-established technique for the examination of three-dimensional arrays of scalar data. Important application areas include medical diagnosis, non-destructive material testing, oil and gas exploration and the simulation of physical phenomena. Typically, data sets can have a size of 128 to 256 data elements in each of three dimensions, or $2^{21}$ to $2^{24}$ "voxels", with a trend towards higher resolutions. Commonly-used expressions of these volumetric elements include a function value F as a short integer (8 to 16 bits), a function value coupled with gradient components $G_x$, $G_y$, $G_z$, F, as color values RGB (8 bits each), or color values and opacity RGBα. Additionally, these voxels may also be associated with a material identifier I that represents different possible materials using an index and which can extend these voxel formats. Each data set format may require its own visualization procedure. The embodiments described below preferably accept all of these data types, but of course, embodiments of the invention may also be applied to other data formats, combinations of formats, to non-image data, and to data representing in general any two or more dimensions.

In certain embodiments discussed below, the basic volume rendering algorithm that is applied to the data types mentioned above is commonly called "perspective raycasting." Starting from a virtual observer's eye, the volumetric data is visualized by shooting a viewing ray through the data set for each pixel on a virtual screen. Basically stated, each ray represents a sampling of points through the volume set, but these sampling points or "raypoints" in general do not lie on the data set grid; that is to say, a voxel represents a single color, intensity and opacity assigned to the smallest visual element in the data set. In a digital world, voxels are essentially average data assigned to a small region of space, and the raypoints may lie anywhere within these regions. Since two adjacent voxels may differ in color, each raypoint is typically computed by averaging the values of adjacent voxels. It is therefore typically necessary to approximate a value of each raypoint by averaging values from surrounding voxels, which is usually done by a process called "tri-linear interpolation." This process essentially assumes every raypoint lies on or somewhere in between two adjacent voxels in each one of X, Y and Z directions, i.e., within a cube consisting of eight voxels; the raypoint lying in this space is calculated by essentially averaging the values of the eight voxels in dependence upon how close the raypoint is to each voxel's center. The precise nature of processing of a raypoint depends on the particular voxel format, since each of the formats mentioned above generally has similar but distinct processes. The common goal of these processes, however, is to assign each raypoint a color and an opacity value. The color and opacity values of all raypoints on a given ray are then "composited" together using simplified absorption models that determine whether individual raypoints are opaque and, if not, how much they influence raypoints behind, to give the final pixel color. A large number of variants to this basic algorithm have been developed over time.

There may be thousands to millions of pixels to be displayed for each image frame, and a typical image frame may have 640×480 pixels, or about three hundred thousand pixels per image. There are applications that use higher resolution displays (e.g., millions of pixels) and those that use lower resolution displays. One of the strengths of volume rendering processes is that many of these processes can display solid objects to appear truly transparent, revealing their inner structures. However, on a two-dimensional screen, these structures are difficult to understand from static images. The fact that it is difficult to display depth in a single image is generally compensated for by allowing the users to quickly adjust their three-dimensional perspective of the data set, thereby being able to reconstruct the three-dimensional structures in real-time from new vantage points. As indicated earlier, real-time operation with at least 10 frames per second is typically desired. Given the huge amounts of data involved, generally millions of voxels effectively being repeatedly processed to yield hundreds of thousands of pixels through raycasting, generally ten times or more per second, real-time volume rendering is conventionally considered to be available only on special-purpose hardware or large parallel computers.

The embodiments described below apply memory management techniques, specifically cache management techniques, and data storage and manipulation techniques to improve data processing capabilities on conventional computing devices (e.g., workstations and laptop computers) as well as special-purpose hardware and large parallel computers. These embodiments will be explained in greater detail, first by introducing memory management techniques for some conventional processors and, later, by explaining perspective raycasting using memory managed in this manner.

II. Implementation of Spread Memory

One embodiment of the invention implements these principles by managing quick access memory efficiently to both handle data and also manage buffers, look-up tables and other parameters used to process the data. "Quick access memory" as used herein can be nearly any type of conventional memory used in a computer to provide relatively quick processing, e.g., as random access memory ("RAM") might be used to temporarily store data that is periodically fetched from a memory housing the data set, also referred to herein as "main memory." Main memory typically stores data stored on some machine-readable media, such as hard drive, tape, CDROM, the Internet, a network, or other relatively "slow" data sources. Efficiencies in managing data stored in these memories, and in the provision of this data to a processor are achieved in-part by implementing a spread memory layout for data in main memory.

This operation is explained with reference to FIG. 1. In particular, a main memory (not depicted in FIG. 1) houses a data set that should be assumed to be of significant size, and hence, typically too large to be stored on processor or to be very easily managed. As indicated by function block 11, this data set may represent data that is stored using a spread memory layout. Otherwise stated, conventional wisdom would call for a given data set to be stored as a contiguous group of data, in a contiguous space in memory. The present invention departs from this conventional wisdom and instead calls for breaking the data set up into subsets of data having gaps in memory address in between. This operation may significantly increase the amount of "main memory" required to house the data set, but it will facilitate storing and processing efficiencies that will assist processing by conventional processors, as will be seen below. The precise size of the gaps will also be further discussed below, but it should be noted that the purpose of this spread memory layout is to result in data inherently being addressed such that individual datum or small groups of data may be retrieved and stored in a particular location within quick access memory used by the processor, so as to not overwrite needed processing parameters.

In effect, data from a data set are stored in such a manner that, when called by a processor, the data are inherently mapped to limited portions of quick access memory. By managing data in this manner, overwrite of needed "processing parameters" can be significantly reduced. Main memory is often sufficiently slow, relative to other types of memory, that it may take fifty or more times as long to retrieve needed data or parameters from main memory. Consequently, it is desired to keep processing parameters regularly needed for processing the data in "quick access memory," to avoid such delays. FIG. 1 accordingly sets forth a process whereby a system in accordance with the present invention maps subsets of the data set to specific parts of quick access memory, as reflected by function block 13 seen in FIG. 1.

By operating in this manner, a system embodying the present invention may keep processing parameters in quick access memory at portions not mapped for data set data by the addressing scheme just discussed (in an image processing application, these parameters may include pixel buffers, tile buffers, tables such as look-up tables used for coloring, shading, lighting, texturing, and a myriad of other functions). This operation is represented by reference numeral 15 in FIG. 1. With memory managed in this manner, image processing including operations such as rendering may be performed, as indicated by functional block 17.

Figure 2:
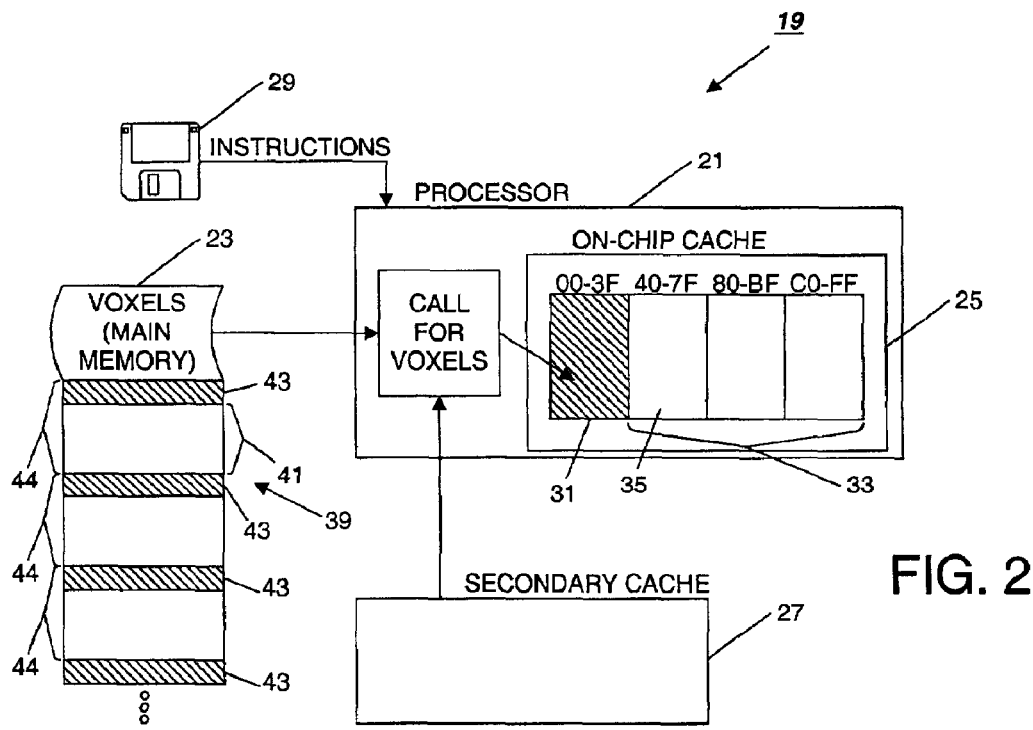
FIG. 2 shows an embodiment of the present invention where a processor having cache is employed in connection with a data set occupying a large memory volume.

FIG. 2 shows further details of a system 19 embodying the invention, specifically a system that includes a processor 21, a main memory 23, and a quick access memory 25 or 27. This memory 25 or 27 may be a processor's cache, that is, fast memory located in or near a processor that enables quick retrieval of needed data; when a processor calls for any data, it first may look to an on-chip cache to see if the data is there, and if the sought-data is missing from that cache, it may try off-chip cache and then main memory in that order. The delay time in retrieving the needed data (e.g., image data or a processing parameter) may be very short for on-chip cache, reasonably short for off-chip cache, and significant if main memory must be queried for data. A "cache miss" which requires search for data from main memory may consume unacceptable amounts of processor time and as a practical matter, may prevent efficient processing of some data, especially volume data, by conventional computing machines.

FIG. 2 also shows several other items used to process data. In particular, such processing typically will be performed under the management of a software program such as stored on machine-readable memory 29. In some instances, the main memory 23 and the program memory 29 may actually be the same device, e.g., a CDROM, DVD or other form of main memory that includes both a program and a data set. Typically, the data set will consist of a very large amount of data; in connection with a single two-dimensional image, for example, there may be hundreds of thousands or millions of pixels that are to be processed; in an application that processes volume elements, or voxels, there may be many millions of such elements to be processed.

To implement the spread memory layout, the main memory 23 stores data in a paginated manner, where contiguous memory space (represented by reference numeral 39 in FIG. 2) is arranged so that the data set is broken up into subsets 43, with gaps 41 in memory address in-between these subsets. Some of these gaps may be used for other purposes, as will be mentioned below, but the point is that data (i.e., voxels in a volumetric application) is split up into groups that occupy non-contiguous portions of memory 23. The gaps are selected to reflect at least a predetermined spacing, ideally a spacing that results in all data mapping to a specific subset of on-chip processor cache.

FIG. 2 in particular illustrates an associative cache as the form of on-chip cache 25 used in one particular embodiment. That is to say, mapping of data from a main memory to a cache typically occurs in the manner of either a direct mapping or an n-way associative mapping. In the case of a direct mapping, every page of memory (for example, a page 44 reflected by a data subset and memory interval before the next data subset) would be mapped to the size of the entire cache under consideration. In a hypothetical instance where a processor had 256 bytes on-chip cache, pages of direct mapped memory would be 256 bytes in size (00-FF hex). Data at the address of 00A1 hex in main memory would be placed when mapped into cache at cache offset A1 hex, as would data from address 01A1 hex, 02A1 hex, 03A1 hex, and so on. With n-way associative mapping, the cache may consist of several units that each may receive a direct mapping; for example, a four-way associative cache having one kilobyte of capacity might be divided into four 256-bytes caches, and each page in memory could be likewise 256 bytes (00-FF hex). In this form of mapping, data at 00A1 hex in main memory would be mapped into line A1 hex of any of the four associative caches on the processor chip, as would line 01A1 hex, and so on. FIG. 2 indicates a first subdivision 31 of a four-way associative cache, and it differentiates this from the rest 33 of the associative cache. Similarly, FIG. 2 also indicates a second subdivision 35 of the four-way associative cache.

Figure 3:
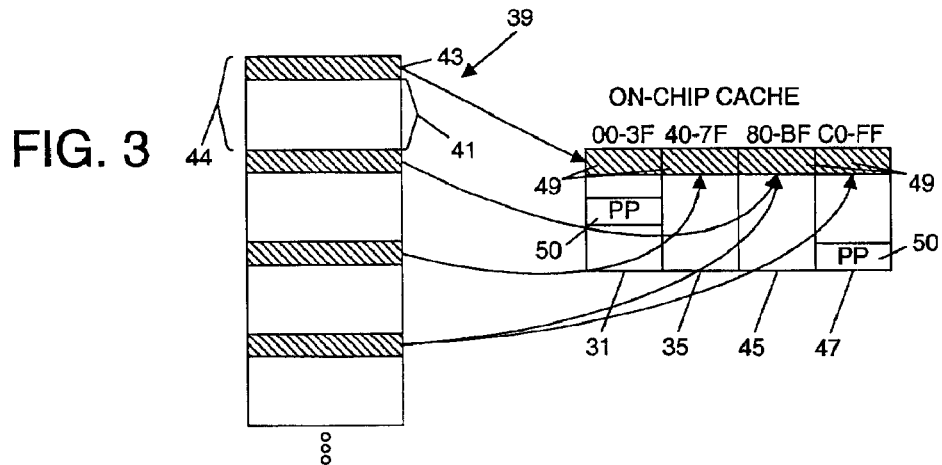
FIG. 3 is an illustrative diagram used to explain use of a spread memory layout and mapping of data such that it does not overwrite processing parameters stored in a quick access memory.

FIG. 3 indicates in further detail the mapping of data to a four-way associative on-chip cache. In FIG. 3, reference numeral 39 refers to contiguous memory space in the main memory, whereas each of four sections of cache are separately identified by reference numerals 31, 35, 45 and 47, respectively; each of these sections is implemented as one mapping of the four-way associative cache. Since the data set is broken up into subsets, each subset occupying a portion 43 of a page 44 of main memory, and since each page is mapped to (as seen in FIG. 3) a one-quarter section of cache, all of the data subsets will necessarily be mapped to a specific, known portion of cache, depicted by reference numeral 49 in FIG. 3. The relative position of data within each page 44 of main memory will correspond to the relative position of data 49 within each part of associative cache, 31, 35, 45 and 47. By effectively locking data set data in this manner, the system inhibits overwrite of processing parameters which may be stored in other parts of cache, as indicated by reference numeral 50 in FIG. 3. Parameters such as buffers, coefficients and tables may also be stored in main memory at addresses in between data subsets, e.g., in the gaps 41 indicated in FIG. 3.

Figure 4:
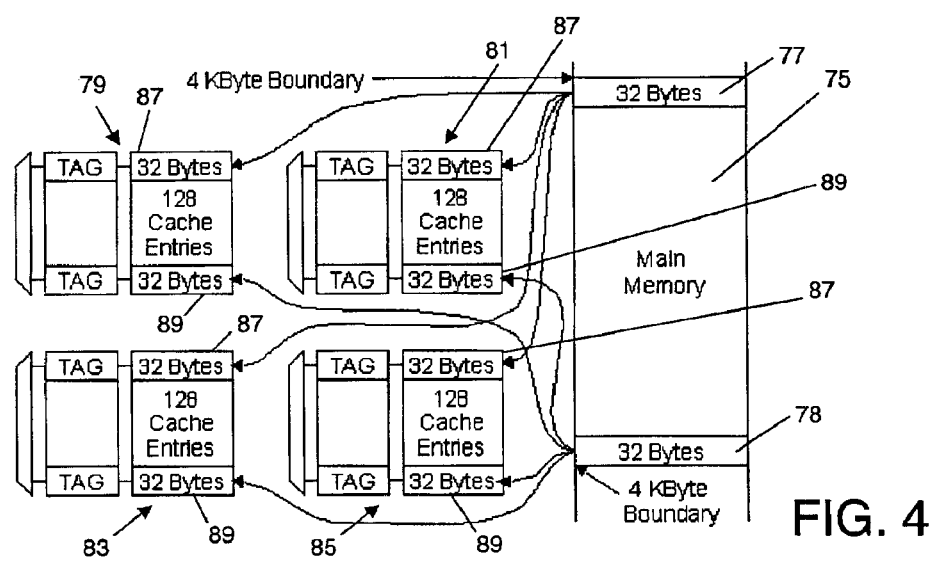
FIG. 4 is a block diagram showing the mapping of data elements in main memory to the four-way set associative level-one ("L1") cache of a "Pentium III" processor.

FIG. 4 illustrates an embodiment where main memory is mapped to cache, again in a four-way associative manner. More particularly, FIG. 4 illustrates the mapping of memory that might be employed in connection with a "Pentium III" CPU (the Pentium series of microprocessors is by Intel Corporation). The Pentium III CPU is featured in a large number of laptops, workstations and other computing devices and may include a sixteen kilobyte "L1" cache, or on-chip processor cache, as well as a larger "L2" or off-chip processor cache defined by fast memory and located near the microprocessor. In this embodiment, it is assumed that memory management techniques embodying the invention are applied to the L1 cache only, but these techniques although not specifically illustrated herein may also be applied to the L2 cache or other forms of quick access memory. Since one object of the present invention is to facilitate processing of large data sets on conventional computing devices, the embodiment described here will make use of the fastest memory possible, i.e., the L1 cache in this embodiment. In this particular case, FIG. 4 illustrates a main memory 75 and individual "lines" of thirty-two bytes stored in main memory. The L1 cache is a four-way associative cache divided into sections 79, 81, 83 and 85. Each page in main memory is divided into four-kilobyte increments, corresponding to mapping of each section of cache (i.e., one-fourth of sixteen kilobytes). Since each storage location in the cache ("cache line") is thirty-two bytes wide, each page in main memory 75 will include one hundred and twenty eight lines that may be mapped, in an associative manner into any of the sections 79, 81, 83 or 85 indicated in FIG. 5. A particular line of main memory, designated by numeral 77 in FIG. 4 and located at the top of a memory page, will be loaded into a corresponding location 87 in cache in any of these four cache sections. Similarly, a second line 78 of memory depicted at the bottom of a memory page will similarly be loaded into a corresponding location 89 in a section of cache.

To effectuate the spread memory layout called for by this structure, in one embodiment, each data element is effectively re-addressed to have a new memory address. For example, if a hypothetical data element in a 65,536 element ($2^{16}$) system has an address of the form $b_{15}b_{14}b_{13}b_{12}b_{11}b_{10}b_9b_8b_7b_6b_5b_4b_3b_2b_1b_0$, a spread memory layout may be achieved by inserting predetermined bits into this addressing scheme, such as given by the following hypothetical address $b_{15}b_{14}b_{13}b_{12}b_{11}b_{10}00b_9b_8b_7b_6b_5b_4b_3b_2b_1b_0$. In this case, a memory having capacity for 262,144 elements is now required, since addition of two bits into the addressing scheme splits the data elements up into sixty-four subsets of one thousand data elements (represented by bits 0–9), each data subset occupying one-quarter of a "page" of memory. For example, if each element in the 65,536 element hypothetical occupies one byte, data subsets would occupy the lowest one kilobyte of each page, and each page would be four kilobytes in size. In this example, the high-order bits (that is, the bits more significant than the zeros in the hypothetical addressing scheme above) identify the page address, and the lower twelve bits (including the two pre-determined "zero" bits that were inserted in this hypothetical address) identify the byte-in-page address of each data element. In this hypothetical, addresses not corresponding to this form, i.e., having the form $b_{15}b_{14}b_{13}b_{12}b_{11}b_{10}01b_9b_8b_7b_6b_5b_4b_3b_2b_1b_0$, $b_{15}b_{14}b_{13}b_{12}b_{11}b_{10}10b_9b_8b_7b_6b_5b_4b_3b_2b_1b_0$ and $b_{15}b_{14}b_{13}b_{12}b_{11}b_{10}11b_9b_8b_7b_6b_5b_4b_3b_2b_1b_0$ would represent memory space gaps and could be used to store processing parameters in main memory. Using a system of the present invention, calls for data set data would not be made to these latter locations, with the result that data mapped to cache will not overwrite corresponding portions of cache, i.e., locations, and may be used for storing processing parameters; in a system having n-way associative cache mappings of four kilobytes each, each of cache addresses $01b_9b_8b_7b_6b_5b_4b_3b_2b_1b_0$, $10b_9b_8b_7b_6b_5b_4b_3b_2b_1b_0$ and $11b_9b_8b_7b_6b_5b_4b_3b_2b_1b_0$ may be used to store processing parameters.

Figure 5:
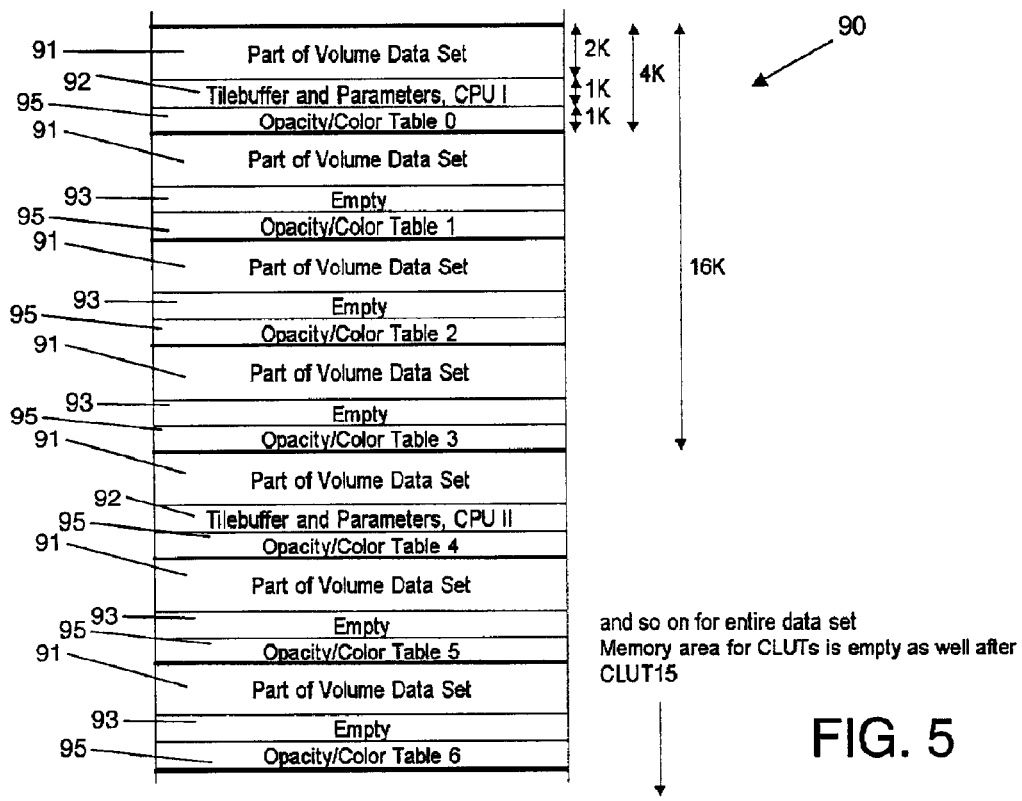
FIG. 5 is a diagram that shows implementation of the "spread memory layout" for the cache-efficient processing of a volume data set.

FIG. 5 provides further detail of an embodiment of the invention where main memory 90 is segregated in this manner. FIG. 5 shows a portion of main memory where seven data subsets 91 as indicated are taking up the lower-half (i.e., the lower two kilobytes) of each four kilobyte page defined in main memory. [In this particular example, and with reference to the foregoing hypothetical, only one pre-determined bit would be set to cause volume data to be limited to the lower half of each page of memory.] A tilebuffer and related parameters used to process volumetric data may be stored as desired in main memory (e.g., on a hard drive) at the location indicated by reference numeral 92 in FIG. 5. [A tilebuffer is used to house intermediate results during image processing of discrete "tiles" that when finished will contribute to a final image.] Other parameters may also be stored in this one-kilobyte section, e.g., the upper second quarter of the initial page in memory. The uppermost quarter of this four-kilobyte page, indicated by reference numeral 95 in FIG. 5, may also be used to store parameters such as color look-up tables and opacity tables. FIG. 5 indicates that sixteen such tables are used in this particular embodiment, all stored in the upper-quarter of each of the first sixteen memory pages. Unused portions of memory falling in the gaps between volume subsets may be left empty, as indicated by reference numeral 93 in FIG. 5.

III. Implementation of Data Interleaving

In one embodiment, additional measures are employed to reduce the number of cache misses that might take place. It will be recalled from the discussion above that the requirement to fetch data from main memory creates significant delays that inhibit efficient processing of a data set. To further reduce these delays, one particular form of the invention calls for use of "interleaving" of data as it is stored in main memory. In one embodiment, this interleaving is applied to each data subset stored in main memory, e.g., to each page in memory.

The effect of "interleaving" will now be explained. Conventional memory storage techniques would call for data to be stored in order of line (across an entire plane), then by plane (across an entire volume set), and so-on; in a $256^3$ voxel set for example, there would be 256 "lines" of 256 voxels, followed in succession by 255 other planes ordered in this same manner (i.e., line by line).

By "interleaving" or "dimensionally-interleaving," as used herein, it is meant that data representing a subset of the data set are dimensionally broken up in the order in which they are stored. "Interleaving" used in a three-dimensional data context calls for data from a different depth value be interleaved with data from a different plane. For example, in a voxel set represented by cubic volume having $256^3$ voxels, dimensional-interleaving would require a full plane of voxels (e.g., a 256×256 plane of voxels) be interleaved with at least one voxel from a different plane. In one embodiment discussed below, "cubic interleaving" is applied, such that every data element in a selected subset, e.g., within a cube of 8×8×8 voxels, is stored using oct-tree addressing to generally be near voxels in other dimensions. This scheme provides significant advantages in processing three-dimensional data, especially in raycasting operations, because whole cubes of multiple data elements may be addressed using only high-order bits and these cubes may be processed without having to seek additional data set data from main memory.

Figure 6:
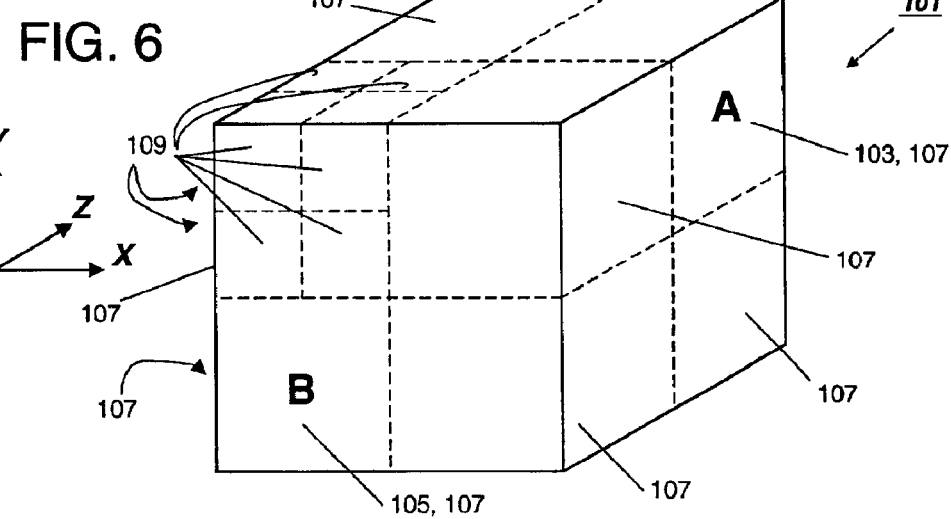
FIG. 6 is an illustrative diagram used to explain "cubic interleaving" as applied to a hypothetical set of voxel data.

FIG. 6 is used to introduce this "cubic interleaving." In particular, FIG. 6 shows a cubic volume 101 that should be assumed to have 256 voxel locations in each of X, Y and Z dimensions, i.e., $256^3$ voxels. The most significant bit indicating X coordinate location indicates whether a voxel is in the upper half of the X coordinate scheme, or the lower half of the X coordinate scheme. Similarly, the most significant bit of Y coordinate location indicates whether a voxel is in the upper half of the Y coordinate scheme, and similarly, the most significant bit of Z coordinate location indicates whether a voxel is in the upper half of the Z coordinate scheme. In a 256×256×256 scheme of voxels, a cubic interleaving will assign the three most significant bits of memory address to effectively subdivide the volume space into two along each dimension. That is to say, volume in an "A-subcube" 103 seen in FIG. 6 will have an address of the form (111xxx . . . xxx) and a "B-subcube" 105 might have an address of the form (000xxx . . . xxx). It is not significant which dimension (X, Y or Z) is represented by the most significant bit in this series of three most significant bits, nor whether the most significant bits correspond to the most or least significant bits in any of X, Y and Z as long as the addressing scheme for voxels is consistent. Similarly, the next three most significant bits of address further subdivide each of eight major cubes 107 further into eight sub-cubes 109, and so on, until the least significant bits result into a subdivision of eight voxels. This type of addressing may also be referred to as "oct-tree" addressing and, in accordance with the embodiment under discussion, it is implemented to cubically-interleave voxels.

As should be apparent from this description, each cube of 8×8×8 voxels when used in connection with a spread memory layout having proper size will generally have a group of relatively more-significant bits that identify the particular cube in the data set, and a group of nine least significant bits that identify each individual voxel in a 8×8×8 cube. In one particular embodiment where only one 8×8×8 cube is loaded into cache at a time using direct mapping, a 8×8×8 cube is identified by address and all voxels corresponding to that cube may be directly loaded as a subset of a memory page into a "locked" or predetermined portion of quick access memory. In an embodiment where n-way associative mapping is used, n-cubes may simultaneously be locked into quick access memory for processing, with a memory management protocol employed to determine the most "stale" of these 8×8×8 cubes and replace that most stale cube with a new 8×8×8 cube that is needed by the processor. Through the use of cubic interleaving, volumes may be accessed efficiently as a page, e.g., cubes of aggregate voxels have an address, and a processor is not necessarily required to interrupt processing to seek additional multiple voxel planes (not in cache) from main memory.

As should be apparent, therefore, the use of interleaving, particularly of cubic interleaving, provides further enhancement to the processor's capabilities, extending the type of image and other data processing operations that may be performed and the efficiency with which these operations may be performed, by reducing required calls to main memory. In an embodiment where quick access memory is a processor cache, the use of interleaving and the use of a spread memory layout each reduce the likelihood of cache misses.

IV. Raycasing and Other Processing

In one application of the embodiments discussed above, a processor will access the main memory to retrieve image data; since this data may consist of a very large number of values, it is processed in subsets, for example, one subset at a time. For purposes of the description below, it should be assumed that the data set is a three-dimensional data set of voxels stored in the main memory; there are other processing schemes and other forms of three-dimensional data, e.g., where objects for example are represented by polygons or surfaces rather than as points of single color and intensity in three-dimensional space (e.g., as voxels). In this particular example, it is to be assumed that there are 256 (or $2^8$) points in each of three dimensions, such that there are a total of $2^{24}$ voxels that are readdressed in the manner indicated above, e.g., to occupy $2^{26}$ memory locations. Each voxel can be of a specific data format, and in the embodiment being discussed here, it will be assumed that the data is in the format of RGBα, that is, where eight bits represents red intensity, eight more bits represents green intensity, eight more bits represents blue intensity, and eight bits represents opacity, for a total of 4 bytes (32 bits) for each voxel.

In one embodiment, the system is implemented primarily in assembly language instructions written for a conventional microprocessor. In particular, these instructions may be written as an executable software file and stored on floppy disk (or burned into ROM as firmware in connection with an application-specific device) and used to control the microprocessor to effectuate direct mapping of volumetric data to a specific 1k- or 4k- (or even 16 k- or 32 k- if the processor cache size permits) byte portion of microprocessor cache. In yet another, more specific embodiment, these instructions may be implemented using "MMX" or "SIMD" extensions of "Pentium-III" instruction set. The "Pentium" series of processors is made by INTEL CORPORATION and analogies generally exist for implementing the invention on other processors and machines such as the processors made by ADVANCED MICRODEVICES ("AMD"), TEXAS INSTRUMENTS, HEWLETT-PACKARD and other companies. In addition, with a trend towards non-traditional computing devices such as "smart" cellular phones, personal data assistants ("PDAs") and other machines, it is foreseeable that the invention may be implemented on these types of systems as well.

An embodiment written for a "Pentium III" processor manages memory and volumetric data in the manner just described for, in one embodiment, the purpose of performing raycasting operations. This embodiment supports at least three different voxel formats: F, FI and $G_z$, $G_y$, $G_x$, F. All of these components are typically 8 bits wide for a voxel depth of 8, 16 and 32 bits, respectively. In case of scalar fields (F), a function value is interpolated at the raypoint location, and the resulting value is used as an address into a color look-up table ("CLUT"). This CLUT contains user-specified RGBα-values in 8-bit precision each and is stored in the "processing parameters" section of cache; a typical size for this type of table may be 1-kilobyte.

As indicated, voxels may be stored in main memory in a cubically-interleaved manner, that is, with bits for coordinate locations for all three dimensions in an oct-tree fashion. While other dimensions may be used (e.g., angular dimensions), in most applications Cartesian coordinates will be used and the dimensional ordering; in an embodiment discussed below, the dimensions are interleaved in a z-first, y-second and x-third manner to have the address function indicated below.

$$(Z_{7..0}Y_{7..0}X_{7..0}) \rightarrow Z_7Y_7X_7Z_6Y_6X_6Z_5Y_5X_5Z_4Y_4X_4Z_3Y_3X_3\text{-}00Z_2Y_2X_2Z_1Y_1X_1Z_0Y_0X_0 \quad (1)$$

This reordering is fairly straightforward and may be performed off-line by hardware, firmware or software logic; in connection with the creation and original recording of a volume set this reordering may be done via shift operations in software.

Once reordered, any cubic region of dimension n occupies exactly n×n×n different memory offsets (n being a power of two). Thus, as long as the bounding cube of the sixteen raypoints of one processing iteration (indicated generally by FIG. 7) fits into the cache, all voxels needed for their processing can be cached. If the raypoint spacing is approximately the grid spacing, an 8×8×8 region can always hold 4×4 raypoints. In case of eight-bit voxels, this requires as little as 512 bytes cache capacity. In case of a Pentium-III CPU, the L1 data cache is a four-way set associative cache with a total capacity of sixteen kilobytes. Typically, the voxels will be cached in the volumetric portion of cache while intermediate results including all raypoint calculations will be part of the processing parameter portion of cache.

Figure 7:
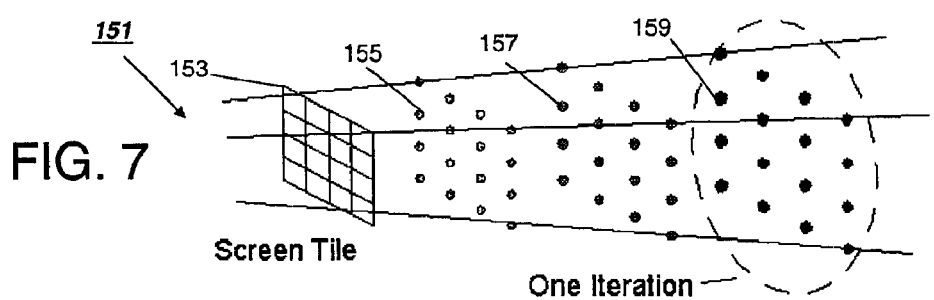
FIG. 7 is an illustrative diagram used to explain raycasting conducted for a screen in groups of 4×4 pixel tiles.

For a good cache coherence, raycasting is performed in one embodiment by dividing a "virtual screen" into 4×4 pixel tiles, and rays are then shot in bundles of sixteen rays, as shown in FIG. 7. In this figure, reference numeral 151 denotes the raycasting operation in general, reference numeral 153 denotes a 4×4 pixel tile, and reference numerals 155, 157 and 159 denote raypoints in groups of sixteen in increasing depth from the virtual screen. These particular size tiles and numbers of rays are chosen in this embodiment, because voxels fetched for a given raypoint can potentially be reused for many new raypoints in its three-dimensional neighborhood. Each raypoint is essentially a sample of the volume space, taken at regular sampling intervals, and the value of each sample point is determined through tri-linear interpolation; that is to say, voxels are digital averages of a small region of volume space and, since raypoints may lie in-between two voxels in each of X, Y and Z dimensions, each raypoint is calculated to be a weighted average of up to eight voxels cubically around the raypoint.

Compositing of raypoints calculated through interpolation is performed using standard alpha-blending. In case of voxels having the format FI, the processing is the same as for F, except that the raypoint is assigned the material identifier I of its nearest-neighbor voxel. This identifier is used to select one of a number of CLUTs, each corresponding to a different "material." Finally, in case of $G_zG_yG_xF$ (the gradients are assumed to be precomputed), each of the components $G_z$ $G_y$ and $G_x$ are sequentially interpolated at the raypoint. As for F, RGBα-values are taken out of a CLUT addressed in dependence upon the value of F. Additionally, the gradient is normalized and used as surface normal for diffuse shading. In one embodiment, using a "Pentium III" processor, additional light sources may be supplied as part of the "other processing parameters" which are retrieved from memory and stored in protected fashion in cache. All of the parameters and processing just specified is performed by the processor, with intermediate values, CLUTs, light sources, textures and other data being stored in the protected portion of cache and with a single 8×8×8 voxel cube being direct-mapped into a predetermined block of cache. Blending of raypoints is typically conventional alpha-blending with processing order along the rays is front-to-back, which allows early ray termination to be used for further speed-up. Intermediate results for the sixteen rays for each 4×4 pixel tile as it is processed are stored in a tilebuffer, which is accessed very frequently. The same holds for other variables such as visualization parameters and look-up tables, which are also accessed very frequently, and are therefore stored in the protected portion of cache.

It should be apparent from the description contained above that what has been described is embodiment of the invention, first in the form data processing systems, second in the form of processors running suitable memory and support hardware, firmware or other instructions, and still most recently, to the very specific environment of a "Pentium III" processor, optionally including the use of SSE and/or MMX instructions and possibly other support programs such as "Direct X". These embodiments are not the only implementations of the invention. For example, storage of multidimensional data may be implemented through types of interleaving other than through cubic interleaving; for example, it would be possible to store 8×8×8 voxel cubes (in a volume processing application) in order of eight successive 8×8 tiles, i.e., other than in an oct-tree form. Also, it is possible to apply embodiments of the present invention to two-dimensional data, four-dimensional data, five-dimensional data, etc., and to apply different interleaving schemes to any of these data sets.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. An apparatus comprising a data set stored on machine-readable media, wherein:
   the data set is divided into multiple subsets;
   a spread memory layout is implemented on the machine-readable media, the spread memory layout defining multiple pages in memory, with a subset of data from the data set being mapped to one or more predetermined portions of each page, the portions being less than the capacity of each page; and
   each page is sized to map to quick access memory of a processor, such that image data when fetched from the machine-readable media are mapped into one or more predetermined portions of quick access memory.

2. An apparatus according to claim 1, wherein the data set is primarily volumetric data, and wherein each subset is selected to be a cubic region of volumetric data, with all cubic regions being of like-size.

3. An apparatus according to claim 2, wherein each cubic region includes an 8×8×8 cube of voxels.

4. An apparatus according to claim 1, adapted for use where the quick access memory is an on-chip processor cache, said apparatus further being characterized in that the size of each page having any data from the data set corresponds to size of the on-chip processor cache.

5. An apparatus according to claim 1, adapted for use where the quick access memory is a processor cache, said apparatus further being characterized in that the size of each page having any data from the data set is selected to map to at least a portion of the processor cache.

6. An apparatus according to claim 4, wherein said apparatus is adapted for use with a n-way associative cache, said apparatus being further characterized in that size of each page having image data equals the size of the processor cache divided by n.

7. An apparatus according to claim 4, further comprising sizing each page such that a subset of data from the data set stored in that page occupies less than one-half of page size, and such that data when fetched from machine-readable media can only be loaded into predetermined lines of processor cache, no more than one-half of processor cache capacity.

8. An apparatus according to claim 7, wherein each page is sized such that a subset of data from the data set stored in that page occupies no more than approximately one-quarter of page size, and wherein each subset occupies one or more predetermined, consistent locations within a page, such that all subsets of data from the data set are mapped to one or more specific locations in processor cache each time a page is retrieved from the machine-readable media.

9. An apparatus according to claim 1, wherein each subset occupies a specific contiguous location within each page that is at least one kilobyte in size.

10. An apparatus according to claim 1, wherein each page is at least four kilobytes in size.

11. An apparatus according to claim 1, adapted for use where the data set substantially consists of image data, further comprising processing parameters selected from the group of buffers, tables, a tile buffer, shading tables, and rendering parameters, the processing parameters being stored in a page of memory at a location other than the one or more predetermined portions, to inhibit overwrite of processing parameters by image data.

12. An apparatus according to claim 1, wherein the data for each subset is stored on the machine-readable media in a dimensionally-interleaved manner.

13. An apparatus according to claim 12, wherein the image data is volumetric data and for each subset is stored on the machine-readable media in a cubically-interleaved manner.

14. An apparatus according to claim 12, adapted for use where the data set represents three or more dimensions, wherein the data for each subset is stored on the machine-readable media in a dimensionally-interleaved manner where data for eat least three-dimensions are interleaved.

15. An apparatus for processing a data set, comprising:
   means for mapping data from the data set as part of a page to one or more predetermined portions of a cache; and
   means for mapping processing parameters as part of a page to predetermined portions of the cache, such that processing parameters occupy different portions of cache than data from the data set;
   wherein the addressing of data from the data set and processing parameters is thereby structured such that processing parameters do not overwrite data from the data set when loaded into the cache and such that data from the data set does not overwrite processing parameters when loaded into the same cache.

16. An apparatus according to claim 15, further comprising:
   means for dimensionally-interleaving data from the data set as discrete, contiguous subsets of data, such that each subset represents a multidimensional space.

17. An apparatus according to claim 15, adapted for processing volumetric data, said apparatus further comprising:
   means for cubically-interleaving volumetric data representing three-dimensions using oct-tree addressing.

18. A method of processing a data set, comprising:
   storing the data set in a data set memory in a spread memory layout, with at least a predetermined gap in memory address between each one of multiple subsets of the data;
   storing processing parameters selected in one or more predetermined parts of cache;
   retrieving portions of the image data and mapping retrieved image data into the cache;
   wherein an addressing scheme implemented by the spread memory layout and wherein the mapping into cache cause retrieved data from the data set to be loaded into the cache at locations other than the predetermined parts of cache.

19. A method according to claim 18, wherein the data set substantially consists of volumetric data, further comprising selecting each subset to be a cubic region of volumetric data, with all cubic regions being of like-size.

20. A method according to claim 19, further comprising selecting each cubic region to be an 8×8×8 cube of voxels.

21. A method according to claim 18, adapted for use where the quick access memory is an on-chip processor cache, said method further comprising sizing a gap in memory address in correspondence to a predetermined mapping to on-chip processor cache, such that data from the data set is thereby mapped to at least one predetermined space within the on-chip processor cache.

22. A method according to claim 18, adapted for use where the quick access memory is a processor cache, said method further comprising sizing a gap in memory address in correspondence to a predetermined mapping to the processor cache, such that data is thereby mapped to at least one predetermined space within the processor cache.

23. A method according to claim 22, wherein said method is adapted for use with a n-way associative cache, said method further comprising sizing a gap in memory address such that memory subsets are repeated within memory at an interval equal to the size of the processor cache divided by n.

24. A method according to claim 22, further comprising sizing the gap each in memory address such that each subset of data from the data set when loaded into cache occupies less than one-half of a direct or n-way associated cache space, and such that data from the data set when fetched from machine-readable media can only be loaded into predetermined lines of the cache space, the predetermined lines representing no more than one-half of processor cache capacity.

25. A method according to claim 24, further comprising sizing a gap in memory address such that a subset of data from the data set occupies no more than approximately one-quarter of mapped cache space.

26. A method according to claim 18, further comprising implementing the memory layout results in a mapping of data from the data set to a cache location that is at least one kilobyte in size.

27. A method according to claim 18, further comprising storing each subset of data from the data set in a dimensionally-interleaved manner.

28. A method according to claim 27, and further adapted for the processing of volumetric data, further comprising storing each of multiple subsets of volumetric data in a cubically-interleaved manner.

29. An apparatus, comprising:
 a processor;
 a quick access memory adapted for use by the processor in processing a data set;
 a mechanism for storing the data set in a main memory using a spread memory layout, wherein the spread memory layout is chosen such that
  the data set is divided into subsets of data,
  the subsets are each stored in a page of memory of predetermined size, the page size chosen to map to at least a predetermined portion of the quick access memory, and
  the subsets are restricted to occupy only a selected portion of each page; and
 instructions stored on machine readable media that cause said processor to load processing parameters used for processing the data set into the predetermined portions of quick access memory;
 wherein the selected portion of each page is chosen such that the subsets of data will only occupy specific memory locations within mapped portion of quick access memory, and wherein the instructions cause the loading of processing parameters into the mapped portion of quick access memory at locations other than the specific memory locations, such that the data set is inhibited from overwriting processing parameters when data from the data set is retrieved from main memory and loaded in mapped fashion into the quick access memory.

30. An apparatus according to claim 29, wherein the data set represents multiple dimensions and wherein the mechanism further stores data from the data set in a dimensionally-interleaved manner, such that each page in memory includes dimensionally-interleaved data.

31. An apparatus according to claim 30, wherein the data set substantially consists of volumetric data and wherein the mechanism further stores data from the data set in a cubically-interleaved fashion.

32. An apparatus according to claim 30, wherein the data set substantially consists of image data and wherein the mechanism further stores image data from the data set in a dimensionally-interleaved manner, such that each page in memory includes data that is dimensionally-interleaved in two or more dimensions.

33. An apparatus according to claim 29, wherein the quick access memory is a n-way processor cache and wherein page size is selected to map the subsets to a predetermined portion of any of n sections of processor cache.

34. An apparatus according to claim 33, wherein the quick access memory is an on-chip processor cache.

35. An apparatus according to claim 29, wherein the data set substantially consists of volumetric data, said apparatus further comprising instructions stored on machine-readable media that when executed cause said processor to perform raycasting using the data set.

36. An apparatus according to claim 29, wherein the processing parameters include parameters selected from the group of a tile buffer, a pixel buffer, shading coefficients, lighting coefficients, texture information and light source information.

* * * * *